United States Patent [19]

Peloquin

[11] Patent Number: 5,781,508

[45] Date of Patent: Jul. 14, 1998

[54] OPTIMIZING THE COMPRESSIONAL WAVE ENERGY RESPONSE OF AN ELASTIC FLUID-FILLED CYLINDER

[75] Inventor: Mark S. Peloquin, Uncasville, Conn.

[73] Assignee: The United States of America as represented by the Secretary of the Navy, Washington, D.C.

[21] Appl. No.: 870,263

[22] Filed: May 29, 1997

[51] Int. Cl.⁶ ................................................. H04R 1/44
[52] U.S. Cl. ................................... 367/154; 367/901
[58] Field of Search ................................. 367/166, 154, 367/171, 901, 106, 130

[56] References Cited

U.S. PATENT DOCUMENTS 5,532,979  7/1996  Hansen et al. .................... 367/130

OTHER PUBLICATIONS

Peloquin, Mark S.; A Closed–Form Dynamic Elasticity Solution to the Fluid/Structure Interaction Problem of a Two–Layer Infinite.

Viscoelastic Cylinder With Inner and Outer Fluid Loading Subject to Forced Harmonic Excitation, NUWC–NPT Technical Report 11,067 29 Dec. 1995.

*Primary Examiner*—Daniel T. Pihulic
*Attorney, Agent, or Firm*—Michael J. McGowan; Prithvi C. Lall; James M. Kasischke

[57] ABSTRACT

A method and system are provided to optimize filtering of compressional wave energy in the wavenumber domain for a given frequency range using a fluid-filled elastic cylinder. The fluid is selected based on its fluid density $\rho_i$ and dilatational wave phase velocity $c_i$. The selected fluid must satisfy the relationship $$10\log\left(\frac{P_i(r_1)}{P_o}\right)^2 \geq 0$$

for the given frequency range where $P_i$ is the magnitude of the pressure field in the fluid at a point within the fluid defined by a distance $r_1$ from the cylinder's central longitudinal axis and $P_o$ is the magnitude of the impinging compressional wave, and must control at least one of the breathing wave response, the extensional wave response and the fluid P-wave response.

21 Claims, 3 Drawing Sheets

OPTIMIZING THE COMPRESSIONAL WAVE ENERGY RESPONSE OF AN ELASTIC FLUID-FILLED CYLINDER

STATEMENT OF GOVERNMENT INTEREST

The invention described herein may be manufactured and used by or for the Government of the United States of America for Governmental purposes without the payment of any royalties thereon or therefor.

CROSS-REFERENCE TO RELATED PATENT APPLICATIONS

This patent application is co-pending with one related patent application No. 08/865,151 filed on May 29, 1997, entitled "METHOD AND APPARATUS FOR FREQUENCY FILTERING USING AN ELASTIC, FLUID-FILLED CYLINDER" by the same inventor as this patent application.

BACKGROUND OF THE INVENTION

(1) Field of the Invention

The present invention relates generally to controlling compressional wave energy response, and more particularly to a method and apparatus for optimizing the response of an elastic fluid-filled cylinder (such as those used in towed arrays) to compressional wave energy using the elastic fluid-filled cylinder.

(2) Description of the Prior Art

Towed acoustic arrays are used in a variety of commercial and military applications. For example, towed arrays are used in seismic survey applications as well as in antisubmarine warfare applications. In general, a towed array is used to measure a pressure field propagating in a fluid environment. A towed array typically consists of a plurality of hydrophones encased within a fluid-filled elastic cylinder. The fluid used to fill the elastic cylinder is matched to the outside fluid environment so that pressure fields are not attenuated as they are transmitted from the outside fluid environment to the fill-fluid surrounding the hydrophones in the array.

When relative motion exists between the array's cylinder and the outer fluid, a turbulent boundary layer will form for most cylinder lengths and flow conditions. The turbulent boundary layer contains dynamic pressure fluctuations at the cylinder wall which presents a noise pressure field to the towed array. This noise pressure field exists in both the wavenumber and frequency domains covering both the propagating and non-propagating regions of the array. The pressure fluctuations in the boundary layer are greatest in the non-propagating region.

The convective ridge, containing the majority of the energy, flows by the array's cylinder at approximately 80% of the free stream velocity of the outer fluid. The pressure levels in the convective ridge are at least an order of magnitude (ten times) greater than the noise pressure level that exists across the propagating region. It is desirable therefore to reduce the level of the pressure field in the non-propagating region of the inner fluid that is caused by the turbulence in the outer fluid. The reason for reducing the pressure levels in the non-propagating region is to prevent them from either being aliased by the array response or appearing in the side lobe signal of the array. Since there is a finite amount of side lobe suppression achievable with respect to wavenumber, the energy in the non-propagating region should be reduced to enhance array performance.

The properties of the fluid-filled elastic cylinder define its propagating and non-propagating regions with respect to wavenumber and frequency. In the propagating region, waves are transmitted by the fluid-filled elastic cylinder with minor attenuation. In the non-propagating region, waves (e.g., the noise pressure field) behave evanescently, i.e., the waves decay with respect to distance from the source. However, for the relatively small diameters of elastic cylinders used in towed arrays (e.g., on the order of several inches or less), there is not enough distance over which the waves can decay. Therefore, the noise pressure field in the non-propagating region of a towed array's fluid-filled elastic cylinder can be detrimental to array performance.

SUMMARY OF THE INVENTION

Accordingly, it is an object of the present invention to provide a method and apparatus that optimizes the compressional wave response of a fluid-filled elastic cylinder in the wavenumber domain for a given frequency range.

Another object of the present invention is to provide a method and apparatus that attenuates unwanted noise pressure fields for a towed array.

Other objects and advantages of the present invention will become more obvious hereinafter in the specification and drawings.

In accordance with the present invention, a method and system are provided to filter compressional wave energy for a given frequency range. An elastic cylinder having a central longitudinal axis is provided. A fluid is selected to fill the elastic cylinder based on a fluid density $\rho_i$ and a dilatational wave phase velocity $c_i$ thereof. The fluid is selected to:

i) provide a first radial resonance frequency of the elastic cylinder such that, when the filled elastic cylinder is immersed in a fluid environment and subjected to a compressional wave having a magnitude $P_o$ propagating in the fluid environment such that a pressure field in the fluid is generated that includes at least one of a breathing wave response, an extensional wave response and a fluid P-wave response, the relationship $$10 \log \left( \frac{P_i(r_1)}{P_o} \right)^2 \geq 0 \qquad (1)$$

is satisfied for the given frequency range where $P_i$ is the magnitude of the pressure field in the fluid at a point within the fluid defined by a distance $r_1$ from the central longitudinal axis, and ii) control at least one of the breathing wave response, the extensional wave response and the fluid P-wave response.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
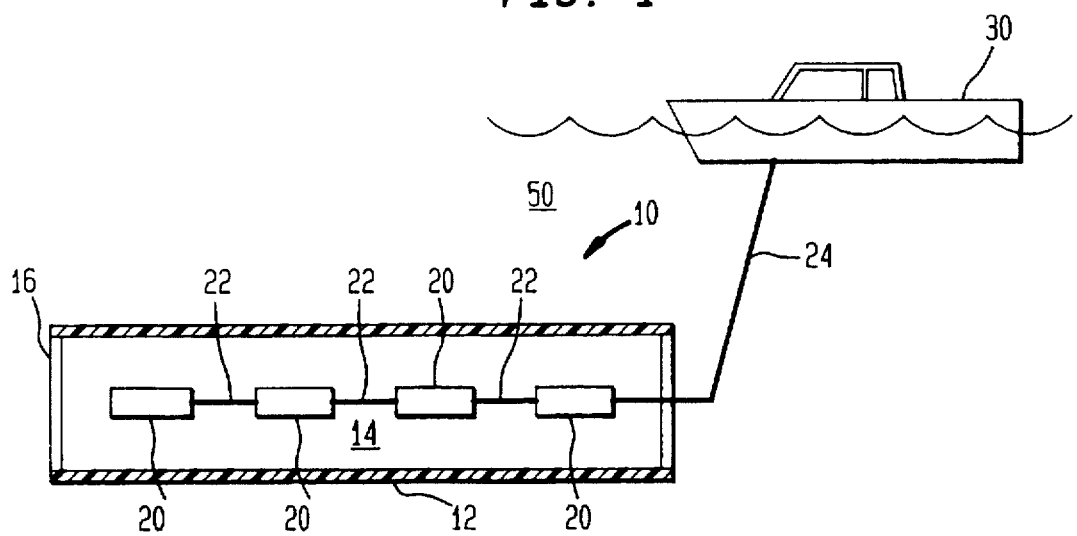
FIG. 1 is a schematic of a pressure-field sensing array configured in accordance with the present invention.

Referring now to the drawings, and more particularly to FIG. 1, a pressure-field sensing array is shown and is referenced generally by the numeral 10. Array 10 consists of a sealed elastic cylinder 12 filled with a fluid 14. Sealing of elastic cylinder 12 at either end thereof can be accomplished with end caps or bulkheads 16 and 18 as is known in the art. The length of cylinder 12 is not limited. Maintained within cylinder 12 are a plurality of hydrophones 20 spaced apart from one another along the length of cylinder 12. Electronics (not shown) associated with each hydrophone 20 can be included within cylinder 12 or can be maintained on a host platform, e.g., onboard a ship 30, to which array 10 is tethered. Typically, hydrophones 20 are coupled to one another via communication lines 22, and are further coupled to ship 30 over a tether/communication line 24. In a typical scenario, array 10 is immersed in a fluid environment 50, e.g. seawater, and is towed therethrough by ship 30. As discussed above, it is the movement of fluid environment 50 over cylinder 12 that generates unwanted noise pressure fields over a broad frequency spectrum.

The characteristic impedance for dilatational wave (known also as compressional wave) propagation in a fluid is given by the quantity ρc, where ρ is the fluid density and c is the fluid dilatational wave phase velocity. The inventive method and apparatus described herein employs selective differences in the density and dilatational wave phase velocity between fluid 14 and fluid environment 50 to optimize the compressional wave energy response of an elastic fluid-filled cylinder for a given frequency range. In other words, elastic cylinder 12 and fluid 14 function as a mechanical pressure filter. In this description, the density of fluid 14 will be designated $\rho_i$, the dilatational wave phase velocity in fluid 14 will be designated $c_i$, the density of fluid environment 50 will be designated $\rho_o$ and the dilatational wave phase velocity in fluid environment 50 will be designated $c_o$.

Figure 2:
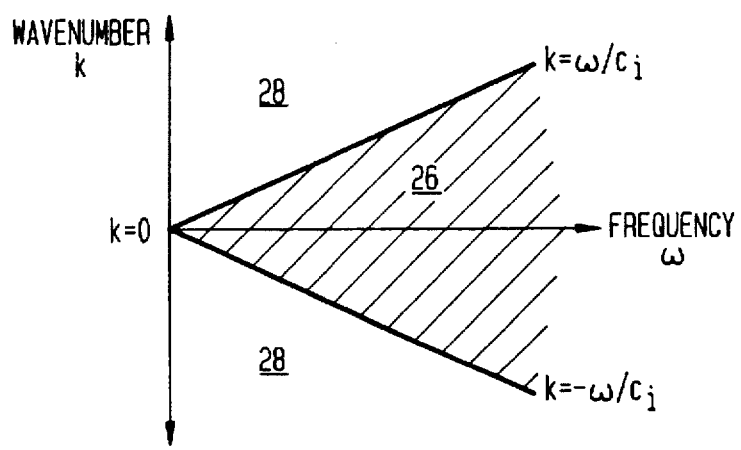
FIG. 2 is a graph of wavenumber k versus frequency ω for the fluid in the array's cylinder indicating the propagating and non-propagating regions of the wavenumber-frequency plane.

The mathematical space for discussing the present invention is known as the wavenumber-frequency space or plane defined by the relationship k=2π/λ, where k is the wavenumber in radians/meter and λ is the spatial wavelength of vibration. Within the wavenumber-frequency plane, the pressure field in either fluid 14 or outer fluid environment 50 is characterized by two distinct regions, a propagating and a non-propagating region. The propagating region for inner fluid 14 is contained between the lines k=±ω/$c_i$ and is hatched as shown at 26 in FIG. 2. In propagating region 26, the radial variation of the pressure field follows the Bessel function of the first kind, and does not undergo decay with respect to radial position within cylinder 12. The remainder of the wavenumber-frequency plane comprises the non-propagating region 28 where |k|>|ω/$c_i$|. Pressure fields in non-propagating region 28 impinging on the outer surface of the cylinder undergo an exponential decay. The decay follows a modified Bessel function where decay varies with respect to radial position within cylinder 12.

The magnitude of the inner fluid pressure field $P_i$, normalized by the outer fluid pressure field magnitude $P_o$, is expressed in decibels (dB) according to the following equation $$10 \log \left( \frac{P_i(r_1)}{P_o} \right)^2 \quad (2)$$

where $r_1$ is the radial distance from the central longitudinal axis of cylinder 12 at which the inner pressure field is evaluated. The mathematical derivation of the dynamic response is contained in "A Closed-Form Dynamic Elasticity Solution to the Fluid/Structure Interaction Problem of a Two-Layer Infinite Viscoelastic Cylinder With Inner and Outer Fluid Loading Subject to Forced Harmonic Excitation," by M. S. Peloquin, NUWC-NPT Technical Report 11,067, Naval Undersea Warfare Center, Newport, R.I., June 1996, the contents of which are hereby incorporated by reference.

As mentioned above, the prior art attempts to match the density ρ and dilatational wave phase velocity c of both fluid 14 and outer fluid environment 50 to prevent attenuation of pressure fields. However, the present invention employs selective differences between fluid 14 and outer fluid environment 50 in terms of density and dilatational wave phase velocity to optimize the compressional wave response of array 10. Such optimization is accomplished in terms of controlling the magnitude of at least one of the breathing wave response, extensional wave response and fluid P-wave response.

The breathing wave can be thought of as a cylinder/fluid shear wave even though the primary particle velocity is radial. Since energy propagates in the longitudinal direction perpendicular to particle velocity, the behavior is more characteristic of a shear wave. The extensional wave is essentially the propagation of a dilatational wave within the geometry constraints of finite circumferential length. The nature of the extensional wave is such that the particle velocity and energy propagation are collinear in the longitudinal direction of the cylinder. The fluid P-wave becomes evident above the first radial resonance of the cylinder and is due to sympathetic vibration of the cylinder wall and the dilatational wave propagation of the fluid.

In general, breathing wave response is attenuated by selecting a fluid 14 having a fluid density $\rho_i$ and a dilatational wave phase velocity $c_i$ that are each less than the respective fluid density $\rho_o$ and dilatational wave phase velocity $c_o$ of outer fluid environment 50. Conversely, breathing wave response is amplified by selecting a fluid 14 having a fluid density $\rho_i$ greater than fluid density $\rho_o$ and a dilatational wave phase velocity $c_i$ that is less than and dilatational wave phase velocity $c_o$ of outer fluid environment 50.

Extensional wave response is attenuated when: i) fluid density $\rho_i$ is approximately equal to fluid density $\rho_o$ and dilatational wave phase velocity $c_i$ is greater than dilatational wave phase velocity $c_o$, ii) fluid density $\rho_i$ is less than fluid density $\rho_o$ and dilatational wave phase velocity $c_i$ is less than dilatational wave phase velocity $c_o$, iii) fluid density $\rho_i$ is less than fluid density $\rho_o$ and dilatational wave phase velocity $c_i$ is approximately equal to dilatational wave phase velocity $c_o$, or iv) fluid density $\rho_i$ is less than fluid density $\rho_o$ and dilatational wave phase velocity $c_i$ is greater than dilatational wave phase velocity $c_o$. Extensional wave response is amplified when: i) fluid density $\rho_i$ is greater than fluid density $\rho_o$ and dilatational wave phase velocity $c_i$ is greater than dilatational wave phase velocity $c_o$. ii) fluid density $\rho_i$ is greater than fluid density $\rho_o$ and dilatational wave phase velocity $c_i$ is approximately equal to dilatational wave phase velocity $c_o$. iii) fluid density $\rho_i$ is greater than fluid density $\rho_o$ and dilatational wave phase velocity $c_i$ is less than dilatational wave phase velocity $c_o$, or iv) fluid density $\rho_i$ is approximately equal to fluid density $\rho_o$ and dilatational wave phase velocity $c_i$ is less than dilatational wave phase velocity $c_o$.

Fluid P-wave response is attenuated when: i) fluid density $\rho_i$ is greater than fluid density $\rho_o$ and dilatational wave phase velocity $c_i$ is greater than dilatational wave phase velocity $c_o$. ii) fluid density $\rho_i$ is greater than fluid density $\rho_o$ and dilatational wave phase velocity $c_i$ is approximately equal to dilatational wave phase velocity $c_o$. iii) fluid density $\rho_i$ is approximately equal to fluid density $\rho_o$ and dilatational wave phase velocity $c_i$ is greater than dilatational wave phase velocity $c_o$, or iv) fluid density $\rho_i$ is less than fluid density $\rho_o$ and dilatational wave phase velocity $c_i$ is greater than dilatational wave phase velocity $c_o$. Fluid P-wave response is amplified when: i) fluid density $\rho_i$ is greater than a fluid density $\rho_o$ and dilatational wave phase velocity $c_i$ is less than dilatational wave phase velocity $c_o$, ii) fluid density $\rho_i$ is approximately equal to fluid density $\rho_o$ and dilatational wave phase velocity $c_i$ is less than dilatational wave phase velocity $c_o$, iii) fluid density $\rho_i$ is less than fluid density $\rho_o$ and dilatational wave phase velocity $c_i$ is less than dilatational wave phase velocity $c_o$, or iv) fluid density $\rho_i$ is less than fluid density $\rho_o$ and dilatational wave phase velocity $c_i$ is approximately equal to dilatational wave phase velocity $c_o$.

If outer fluid environment 50 is seawater ($\rho_o$=1026 kg/m$^3$ and $c_o$=1500 m/sec) or fresh water ($\rho_o$=998 kg/m$^3$ and $c_o$=1481 m/sec), an analysis of $\rho$ and c values of various fluids is used to select a fluid 14 based on the above-outlined general constraints. For example, with respect to controlling the extensional wave response in a fresh water or seawater environment, fluids that fit the general constraints outlined above for amplifying the extensional wave response include, for example, mercury, glycerin, carbon disulfide, carbon tetrachloride, chloroform, ethanol amide, ethylene glycol, glycerol and nitrobenzene. Examples of fluids that fit the general constraints outlined above for attenuating the extensional wave response include, for example, castor oil, ethyl alcohol, turpentine, acetone, benzene, ethanol, ethyl ether, kerosene and methanol. Similar suitable-fluid lists can be developed to meet the general constraints for the breathing wave and fluid P-wave responses.

By way of further illustration, simulations were performed to show how the present invention can be used to control the magnitude of the inner pressure field of an elastic fluid-filled cylinder. The details of the simulations are discussed in the aforementioned Technical Report incorporated by reference and will therefore not be presented herein. Briefly, the simulations depict the dynamic response of a fluid-filled elastic cylinder (that is immersed in a fluid environment) to a pressure impinging on and normal to the outer surface of the cylinder. The exciting pressure field is a traveling wave of arbitrary wavenumber k and frequency ω and can be expressed mathematically as $$P_o e^{i(kx-\omega t)} \quad (3)$$

where x is the longitudinal coordinate coincident with the longitudinal axis of the cylinder, and t is time. The simulations were performed for an outer fluid environment similar to water, i.e., fluid density $\rho_o$=1000 kg/m$^3$ and dilatational wave phase velocity $c_o$=1500 m/sec. These values were held constant for all cases of the simulations. The properties of the simulated elastic cylinder were as listed below in Table 1. Typically, the elastic cylinder is made from a rubber or urethane material such as ESTANE 58881 or ESTANE 58886 available commercially from BF Goodrich. Other suitable materials include melt-process rubbers such as ALCRYN 1160, 1180 or 3155 commercially available from DuPont.

TABLE 1

Properties of Simulated Elastic (e.g., ALCRYN) Cylinder

| Property | Value/Units |
|---|---|
| Young's Modulus | $1.0 \times 10^8$ N/m$^2$ |
| Structural Loss Factor | 0.3 |
| Density | 1070 kg/m$^3$ |
| Poisson's Ratio | 0.4 |
| Inner Radius | 1.2 inches |
| Outer Radius | 1.5 inches |
| Radial Wall Thickness | 0.3 inches |

The magnitude of the inner pressure field of fluid 14 is controlled by variations in fluid density $\rho_i$ of the fill-fluid (i.e., fluid 14) and dilatational wave phase velocity $c_i$ of fluid 14. A number of such variations and resulting breathing wave, extensional wave and fluid P-wave response peaks are listed in Tables 2, 3 and 4, respectively. Each Case 0 is representative of the situation where fluid 14 matches that of the outer fluid environment, i.e., $\rho_i = \rho_o$ and $c_i = c_o$.

The three waves of interest, i.e., breathing wave, extensional wave and fluid P-wave, have increasing phase velocities, respectively. Therefore, it is necessary to perform simulations at increasingly higher frequencies in order to observe the resonant peak of each wave clearly. Energy propagates in the breathing wave with the lowest phase velocity (approximately 100 meters/second), therefore 300 Hz was chosen for the breathing wave simulation. Energy is propagating in the extensional wave at approximately 300 meters/second, therefore 3000 Hz was chosen for this simulation. The fluid P-wave propagates energy at approximately 122 meters/second, therefore 4500 Hz was chosen for this simulation.

TABLE 2

Simulation Cases For Controlling Breathing Wave Response at Frequency f = 300 Hz

Figure 3:
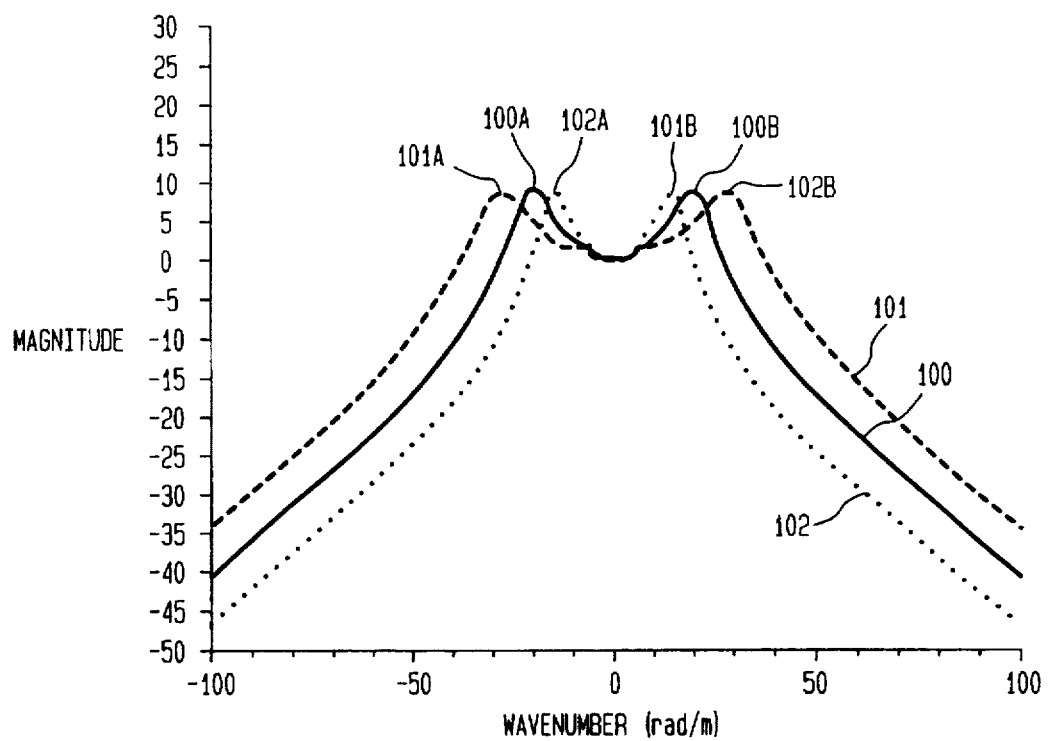
FIG. 3 is a graph of the magnitude ratio as a function of wavenumber for case simulations used to illustrate control of the breathing wave response in accordance with the present invention.

| Case | FIG. 3 Reference Numeral | $\rho_i$, kg/m$^3$ | $c_i$, m/s | Breathing Wave Phase Velocity, m/s | Attenuation at 50 rad/m, decibels |
|---|---|---|---|---|---|
| 0 | 100 | 1000 | 1500 | 89.4 | −15.6 |
| 3 | 101 | 2000 | 750 | 65.2 | −7.6 |
| 6 | 102 | 500 | 750 | 120.7 | −22.6 |

TABLE 3

Simulation Cases For Controlling Extensional Wave Response at Frequency f = 3000 Hz

Figure 4:
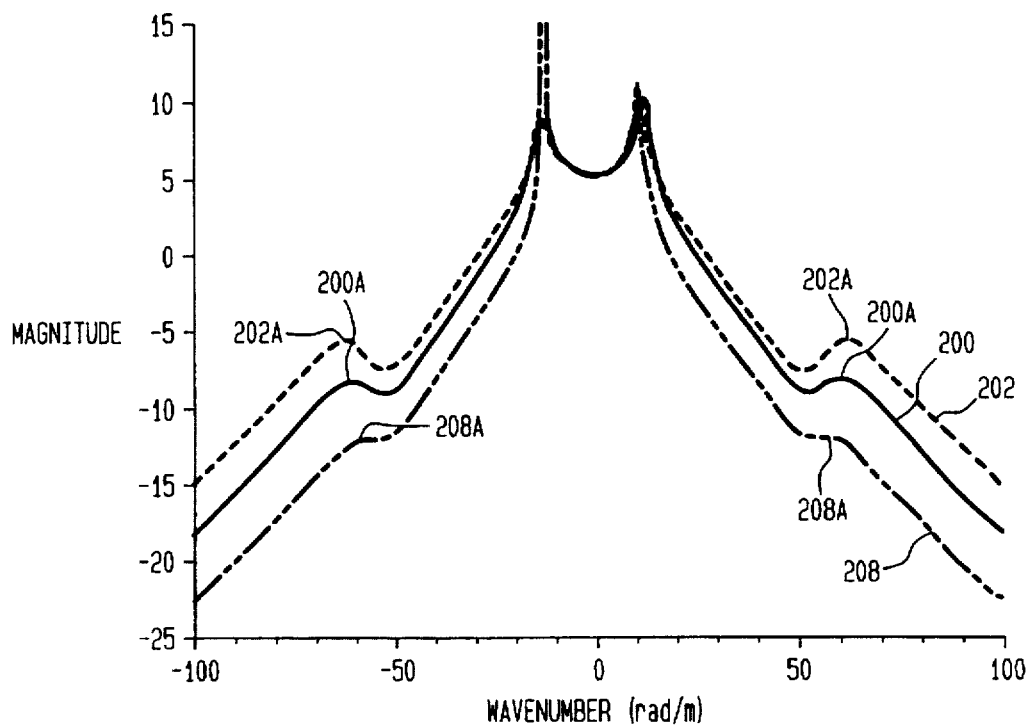
FIG. 4 is a graph of the magnitude ratio as a function of wavenumber for selected case simulations used to illustrate control of the extensional wave response in accordance with the present invention.

| Case | FIG. 4 Reference Numeral | $\rho_i$, kg/m³ | $c_i$, m/sec | Extensional Wave Phase Velocity, m/s | Attenuation @ Extensional Resonant Wave Number, dB |
|---|---|---|---|---|---|
| 0 | 200 | 1000 | 1500 | 305.4 | −13.6 |
| 1 |  | 2000 | 3000 | 297.9 | −11.1 |
| 2 | 202 | 2000 | 1500 | 296.0 | −11.1 |
| 3 |  | 2000 | 750 | 294.2 | −10.4 |
| 4 |  | 1000 | 3000 | 305.4 | −13.8 |
| 5 |  | 1000 | 750 | 305.4 | −11.1 |
| 6 |  | 500 | 750 | 330.5 | −10.7 |
| 7 |  | 500 | 1500 | 332.8 | −16.6 |
| 8 | 208 | 500 | 3000 | 330.5 | −17.3 |

TABLE 4

Simulation Cases For Controlling Fluid P-Wave Response at Frequency f = 4500 Hz

Figure 5:
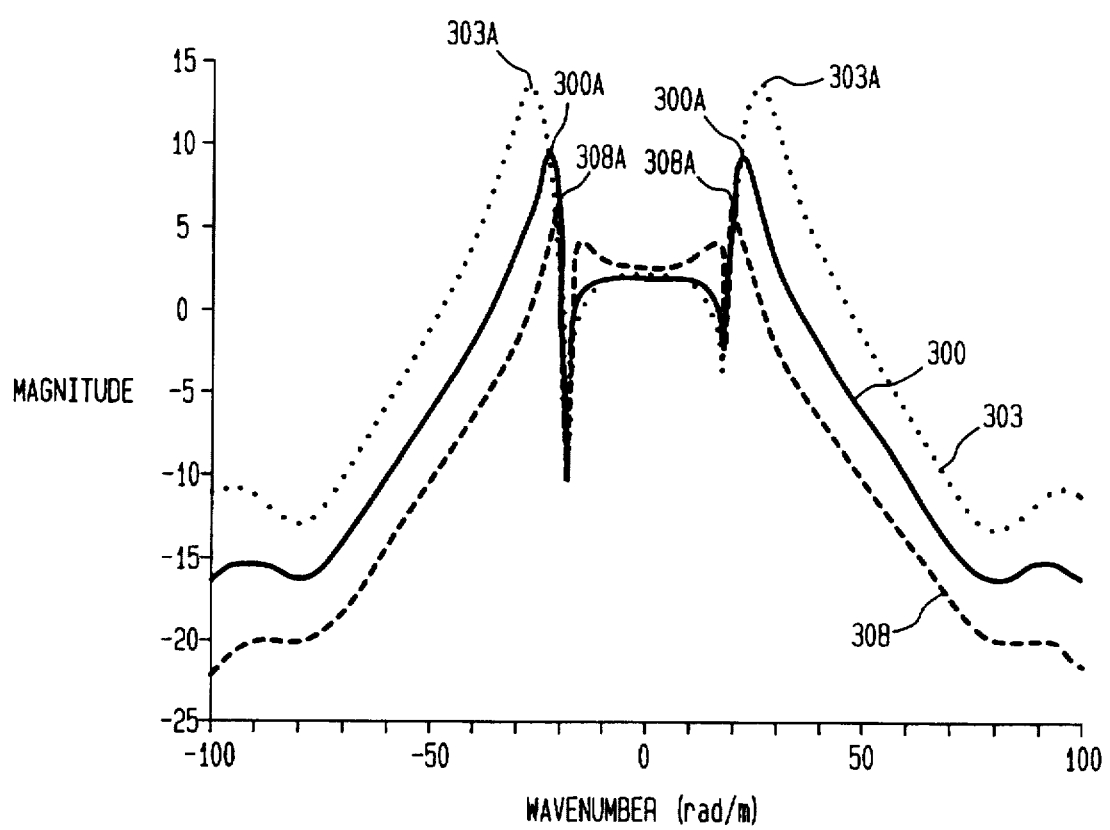
FIG. 5 is a graph of the magnitude ratio as a function of wavenumber for selected case simulations used to illustrate control of the fluid P-wave response in accordance with the present invention.

| Case | FIG. 5 Reference Numeral | $\rho_i$, kg/m³ | $c_i$, m/sec | Fluid P-Wave Phase Velocity, m/s | Gain @ Fluid P-wave Resonant Wave Number, dB |
|---|---|---|---|---|---|
| 0 | 300 | 1000 | 1500 | 1206.2 | +7.3 |
| 1 |  | 2000 | 3000 | 1206.2 | +5.8 |
| 2 |  | 2000 | 1500 | 1167.4 | +6.8 |
| 3 | 303 | 2000 | 750 | 1005.5 | +11.0 |
| 4 |  | 1000 | 3000 | 1247.8 | +5.0 |
| 5 |  | 1000 | 750 | 952.3 | +14.4 |
| 6 |  | 500 | 750 | 861.8 | +18.5 |
| 7 |  | 500 | 1500 | 1247.8 | +5.0 |
| 8 | 308 | 500 | 3000 | 1340.6 | +3.8 |

Selected results of the simulations in Tables 2, 3 and 4 are displayed graphically in FIGS. 3, 4 and 5, respectively, where the curves represent the magnitude ratio of the inner-to-outer pressure field expressed as a decibel in accordance with equation (1) recited above. Each curve is referenced by the number as indicated in Tables 2, 3 and 4. In FIG. 3, corresponding breathing wave resonant peaks are indicated by reference numerals 100A, 101A and 102A. In FIG. 4, corresponding extensional wave resonant peaks are indicated by reference numerals 200A, 202A and 208A. In FIG. 5, corresponding fluid P-wave resonant peaks are indicated by reference numerals 300A, 303A and 308A.

The advantages of the present invention are numerous. When used in a towed array immersed in a fluid environment, the elastic cylinder and its fill-fluid can be used to optimize the compressional wave energy response thereof. Such optimization is achieved by selecting a fill-fluid based on its fluid density and dilatational wave phase velocity. Specifically, attenuation or amplification of one or more of the breathing wave response, extensional wave response and fluid P-wave response is controlled to, for example, to optimize performance of towed arrays.

It is desirable for a towed array that is designed for use in the propagating region of the wavenumber-frequency plane to have the lowest possible pressure levels in the non-propagating region. The particular construction of the towed array cylinder and the design aperture of the channels will dictate which wave, i.e., breathing, extensional or fluid P-wave, is most critically in need of control. The inner fluid will then be selected to control the wave that would introduce the most noise into the array output. When a towed array is designed to measure the pressure field in the non-propagating region, the inner fluid will be selected such that the pressure field in the inner fluid is amplified as much as possible.

Figure 6:
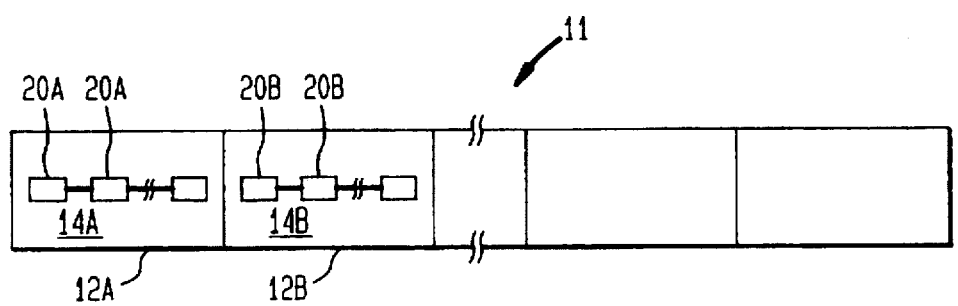
FIG. 6 is a schematic of a pressure-field sensing array having a plurality of sealed cylinder segments, each of which is tuned for a specific first radial resonance frequency in accordance with the present invention.

As shown schematically in FIG. 6, the present invention could also be used to construct a pressure-field sensing array 11 having a plurality of sealed elastic cylinder segments 12A, 12B, . . . Housed within each cylinder segment is one or more hydrophones 20A, 20B, . . . Each cylinder 12A, 12B, . . . can be tuned to a specific first radial resonance frequency and optimized in terms of breathing wave response, extensional wave response and/or fluid P-wave response by selecting each cylinder's fill-fluid 14A, 14B, . . . as described above.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of optimizing the compressional wave energy response of an elastic fluid-filled cylinder as a function of wavenumber for a given frequency range, comprising the steps of:

providing an elastic cylinder having a central longitudinal axis; and selecting a fluid to fill said elastic cylinder based on a fluid density $\rho_i$ and a dilatational wave phase velocity $c_i$ thereof to provide a first radial resonance frequency of said elastic cylinder such that, when said elastic cylinder so-filled is immersed in a fluid environment and subjected to a compressional wave having a magnitude $P_o$ propagating in said fluid environment such that a pressure field in said fluid is generated that includes at least one of a breathing wave response, an extensional wave response and a fluid P-wave response, the relationship $$10\log\left(\frac{P_i(r_1)}{P_o}\right)^2 \geq 0$$

is satisfied for said given frequency range where $P_i$ is the magnitude of said pressure field in said fluid at a point within said fluid defined by a distance $r_1$ from said central longitudinal axis, and control at least one of said breathing wave response, said extensional wave response and said fluid P-wave response.

2. A method according to claim 1 wherein control of said breathing wave response comprises the steps of:

maintaining said fluid density $\rho_i$ less than a fluid density $\rho_o$ of said fluid environment; and maintaining said dilatational wave phase velocity $c_i$ less than a dilatational wave phase velocity $c_o$ of said fluid environment, wherein said breathing wave response is attenuated.

3. A method according to claim 1 wherein control of said breathing wave response comprises the steps of:

maintaining said fluid density $\rho_i$ greater than a fluid density $\rho_o$ of said fluid environment; and maintaining said dilatational wave phase velocity $c_i$ less than a dilatational wave phase velocity $c_o$ of said fluid environment, wherein said breathing wave response is amplified.

4. A method according to claim 1 wherein control of said extensional wave response comprises the steps of:

maintaining said fluid density $\rho_i$ approximately equal to a fluid density $\rho_o$ of said fluid environment; and maintaining said dilatational wave phase velocity $c_i$ greater than a dilatational wave phase velocity $c_o$ of said fluid environment, wherein said extensional wave response is attenuated.

5. A method according to claim 1 wherein control of said extensional wave response comprises the steps of:

maintaining said fluid density $\rho_i$ less than a fluid density $\rho_o$ of said fluid environment; and maintaining said dilatational wave phase velocity $c_i$ less than a dilatational wave phase velocity $c_o$ of said fluid environment, wherein said extensional wave response is attenuated.

6. A method according to claim 1 wherein control of said extensional wave response comprises the steps of:

maintaining said fluid density $\rho_i$ less than a fluid density $\rho_o$ of said fluid environment; and maintaining said dilatational wave phase velocity $c_i$ approximately equal to a dilatational wave phase velocity $c_o$ of said fluid environment, wherein said extensional wave response is attenuated.

7. A method according to claim 1 wherein control of said extensional wave response comprises the steps of:

maintaining said fluid density $\rho_i$ less than a fluid density $\rho_o$ of said fluid environment; and maintaining said dilatational wave phase velocity $c_i$ greater than a dilatational wave phase velocity $c_o$ of said fluid environment, wherein said extensional wave response is attenuated.

8. A method according to claim 1 wherein control of said extensional wave response comprises the steps of:

maintaining said fluid density $\rho_i$ greater than a fluid density $\rho_o$ of said fluid environment; and maintaining said dilatational wave phase velocity $c_i$ greater than a dilatational wave phase velocity $c_o$ of said fluid environment, wherein said extensional wave response is amplified.

9. A method according to claim 1 wherein control of said extensional wave response comprises the steps of:

maintaining said fluid density $\rho_i$ greater than a fluid density $\rho_o$ of said fluid environment; and maintaining said dilatational wave phase velocity $c_i$ approximately equal to a dilatational wave phase velocity $c_o$ of said fluid environment, wherein said extensional wave response is amplified.

10. A method according to claim 1 wherein control of said extensional wave response comprises the steps of:

maintaining said fluid density $\rho_i$ greater than a fluid density $\rho_o$ of said fluid environment; and maintaining said dilatational wave phase velocity $c_i$ less than a dilatational wave phase velocity $c_o$ of said fluid environment, wherein said extensional wave response is amplified.

11. A method according to claim 1 wherein control of said extensional wave response comprises the steps of:

maintaining said fluid density $\rho_i$ approximately equal to a fluid density $\rho_o$ of said fluid environment; and maintaining said dilatational wave phase velocity $c_i$ less than a dilatational wave phase velocity $c_o$ of said fluid environment, wherein said extensional wave response is amplified.

12. A method according to claim 1 wherein control of said fluid P-wave response comprises the steps of:

maintaining said fluid density $\rho_i$ greater than a fluid density $\rho_o$ of said fluid environment; and maintaining said dilatational wave phase velocity $c_i$ greater than a dilatational wave phase velocity $c_o$ of said fluid environment, wherein said fluid P-wave response is attenuated.

13. A method according to claim 1 wherein control of said fluid P-wave response comprises the steps of:

maintaining said fluid density $\rho_i$ greater than a fluid density $\rho_o$ of said fluid environment; and maintaining said dilatational wave phase velocity $c_i$ approximately equal to a dilatational wave phase velocity $c_o$ of said fluid environment, wherein said fluid P-wave response is attenuated.

14. A method according to claim 1 wherein control of said fluid P-wave response comprises the steps of:

maintaining said fluid density $\rho_i$ approximately equal to a fluid density $\rho_o$ of said fluid environment; and maintaining said dilatational wave phase velocity $c_i$ greater than a dilatational wave phase velocity $c_o$ of said fluid environment, wherein said fluid P-wave response is attenuated.

15. A method according to claim 1 wherein control of said fluid P-wave response comprises the steps of:

maintaining said fluid density $\rho_i$ less than a fluid density $\rho_o$ of said fluid environment; and maintaining said dilatational wave phase velocity $c_i$ greater than a dilatational wave phase velocity $c_o$ of said fluid environment, wherein said fluid P-wave response is attenuated.

16. A method according to claim 1 wherein control of said fluid P-wave response comprises the steps of:

maintaining said fluid density $\rho_i$ greater than a fluid density $\rho_o$ of said fluid environment; and maintaining said dilatational wave phase velocity $c_i$ less than a dilatational wave phase velocity $c_o$ of said fluid environment, wherein said fluid P-wave response is amplified.

17. A method according to claim 1 wherein control of said fluid P-wave response comprises the steps of:

maintaining said fluid density $\rho_i$ approximately equal to a fluid density $\rho_o$ of said fluid environment; and maintaining said dilatational wave phase velocity $c_i$ less than a dilatational wave phase velocity $c_o$ of said fluid environment, wherein said fluid P-wave response is amplified.

18. A method according to claim 1 wherein control of said fluid P-wave response comprises the steps of:

maintaining said fluid density $\rho_i$ less than a fluid density $\rho_o$ of said fluid environment; and maintaining said dilatational wave phase velocity $c_i$ less than a dilatational wave phase velocity $c_o$ of said fluid environment, wherein said fluid P-wave response is amplified.

19. A method according to claim 1 wherein control of said fluid P-wave response comprises the steps of:

maintaining said fluid density $\rho_i$ less than a fluid density $\rho_o$ of said fluid environment; and maintaining said dilatational wave phase velocity $c_i$ approximately equal to a dilatational wave phase velocity $c_o$ of said fluid environment, wherein said fluid P-wave response is amplified.

20. A pressure filtering apparatus for optimizing the compressional wave energy response in the wavenumber domain over a given frequency range, comprising:

an elastic cylinder having a central longitudinal axis; and a fluid filling said elastic cylinder, said fluid being chosen based on a fluid density $\rho_i$ and a dilatational wave phase velocity $c_i$ thereof to i) provide a first radial resonance frequency of said elastic cylinder such that, when said elastic cylinder so-filled is immersed in a fluid environment and subjected to a compressional wave having a magnitude $P_o$ propagating in said fluid environment such that a pressure field in said fluid is generated that includes at least one of a breathing wave response, an extensional wave response and a fluid P-wave response, the relationship $$10 \log \left( \frac{P_i(r_1)}{P_o} \right)^2 \geq 0$$

is satisfied for said given frequency range where $P_i$ is the magnitude of said pressure field in said fluid at a point within said fluid defined by a distance $r_1$ from said central longitudinal axis, and ii) control at least one of said breathing wave response, said extensional wave response and said fluid P-wave response.

21. A pressure-field sensing array comprising:

an elastic cylinder having a central longitudinal axis, said elastic cylinder being divided into a plurality of sealed segments;

at least one hydrophone in each of said plurality of sealed segments optimized for sensing compressional wave energy in a unique frequency range; and a fluid filling each of said plurality of sealed segments, each said fluid being chosen based on a fluid density $\rho_i$ and a dilatational wave phase velocity $c_i$ thereof to i) provide a first radial resonance frequency for a respective one of said plurality of sealed segments such that, when said elastic cylinder so-filled is immersed in a fluid environment and subjected to a compressional wave having a magnitude $P_o$ propagating in said fluid environment such that a pressure field in said fluid of said respective one is generated that includes at least one of a breathing wave response, an extensional wave response and a fluid P-wave response, the relationship $$10 \log \left( \frac{P_i(r_1)}{P_o} \right)^2 \geq 0$$

is satisfied for said frequency range associated with said respective one where $P_i$ is the magnitude of said pressure field in said fluid of said respective one at a point therein defined by a distance $r_1$ from said central longitudinal axis, and ii) control at least one of said breathing wave response, said extensional wave response and said fluid P-wave response.

* * * * *